Dec. 28, 1954  E. W. HOLMES ET AL  2,697,948
CABLE DRUM WINDING AND UNWINDING MECHANISM
Filed Dec. 28, 1944  8 Sheets-Sheet 4
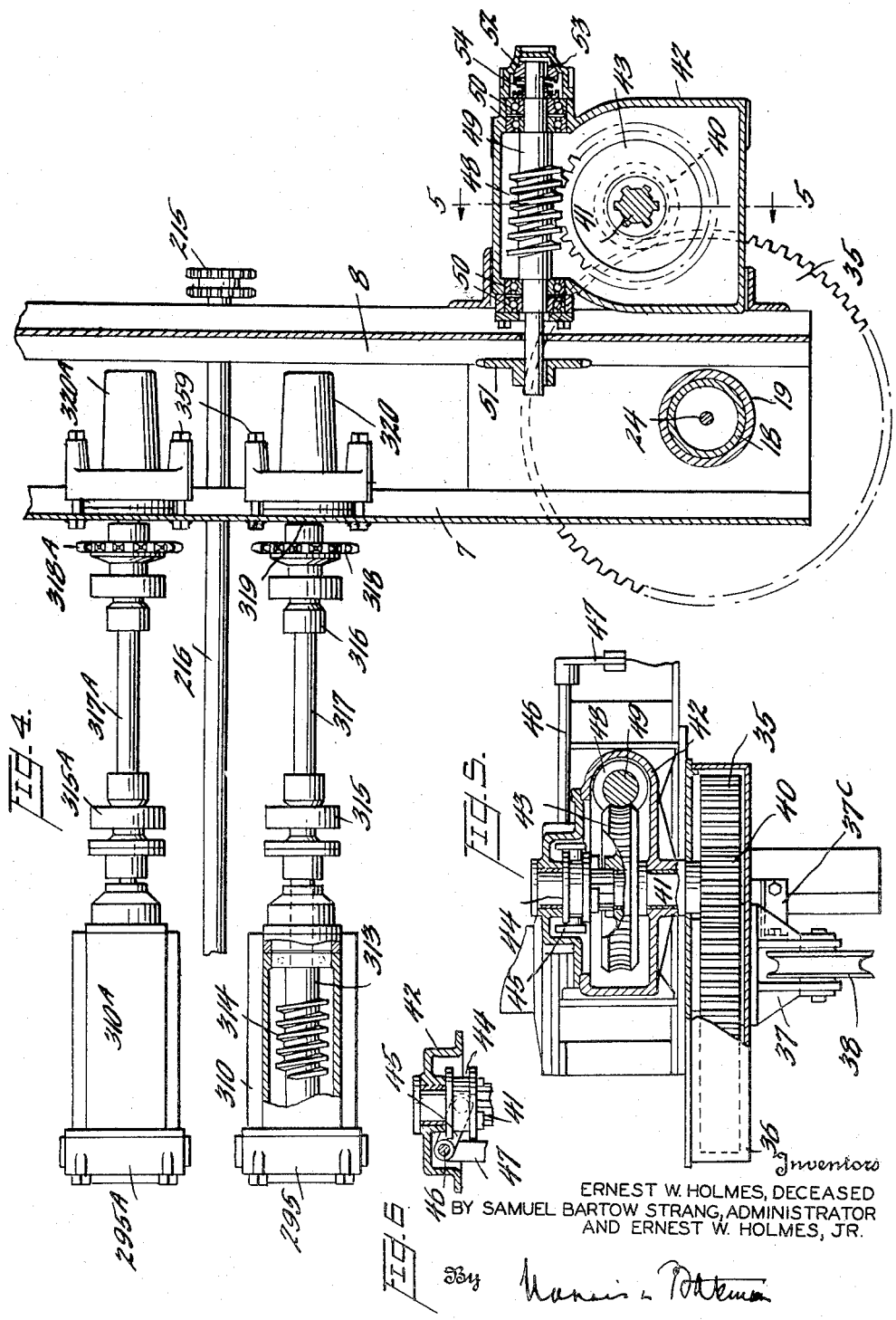
Inventors
ERNEST W. HOLMES, DECEASED
BY SAMUEL BARTOW STRANG, ADMINISTRATOR
AND ERNEST W. HOLMES, JR.
Attorneys

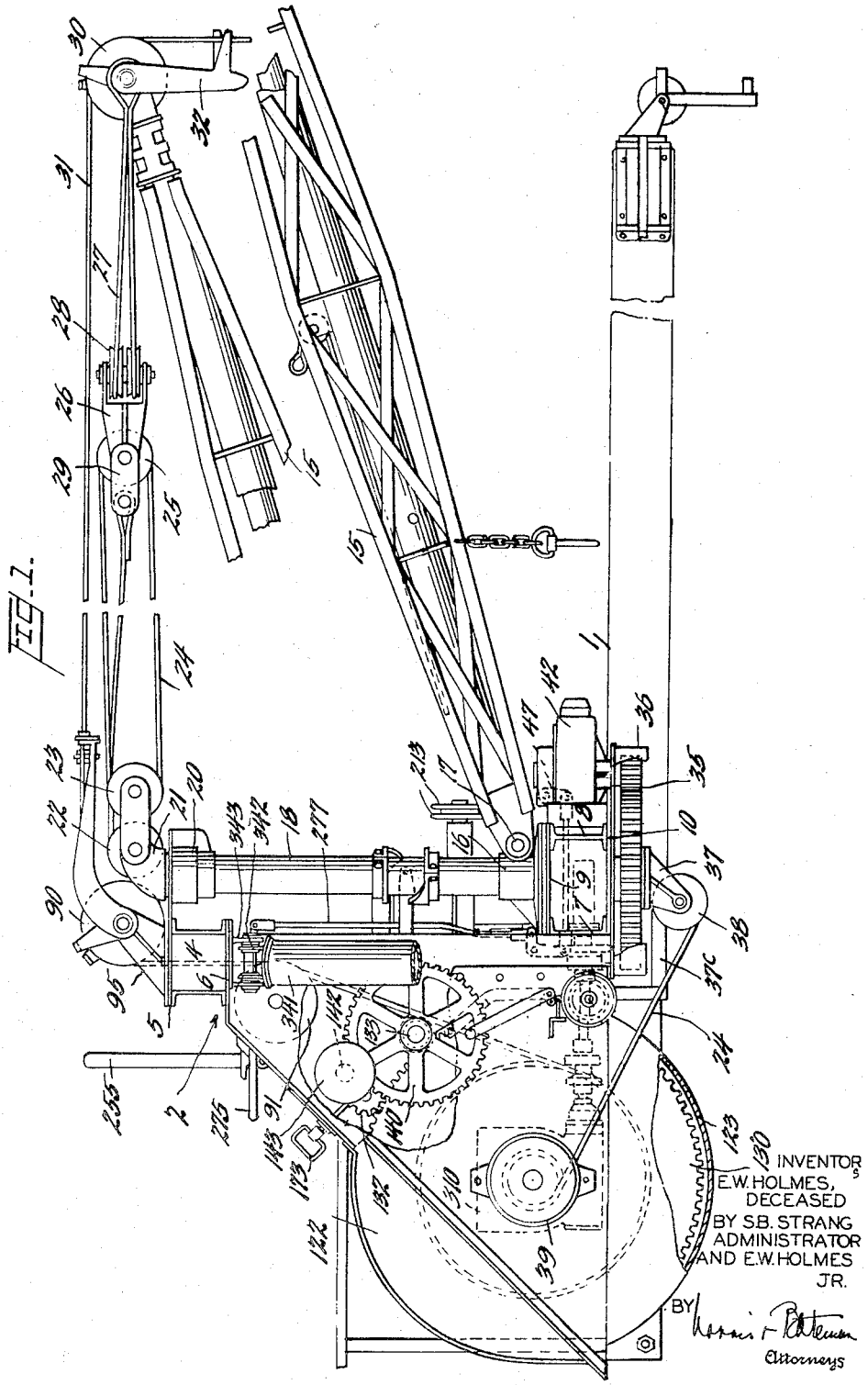

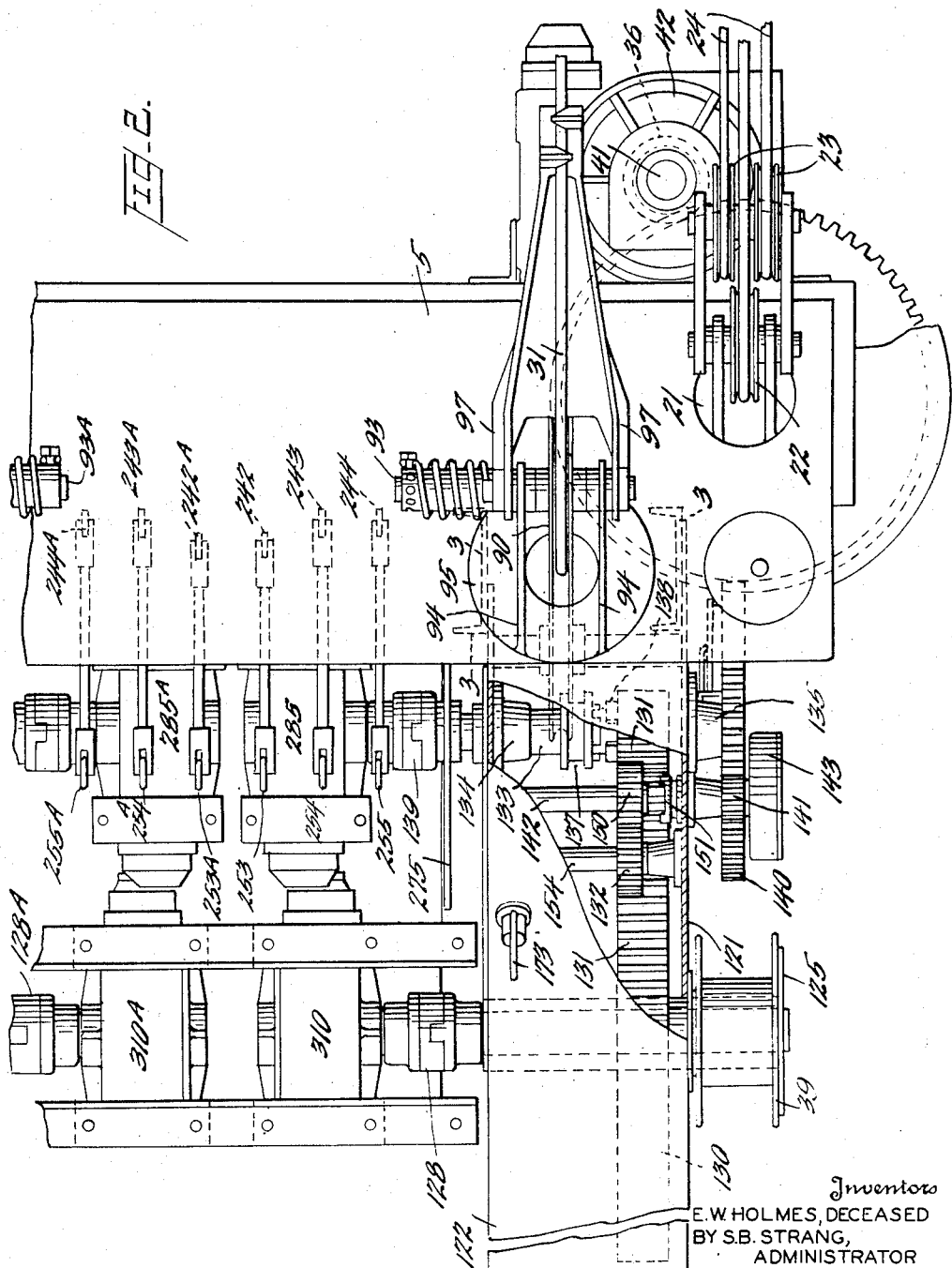

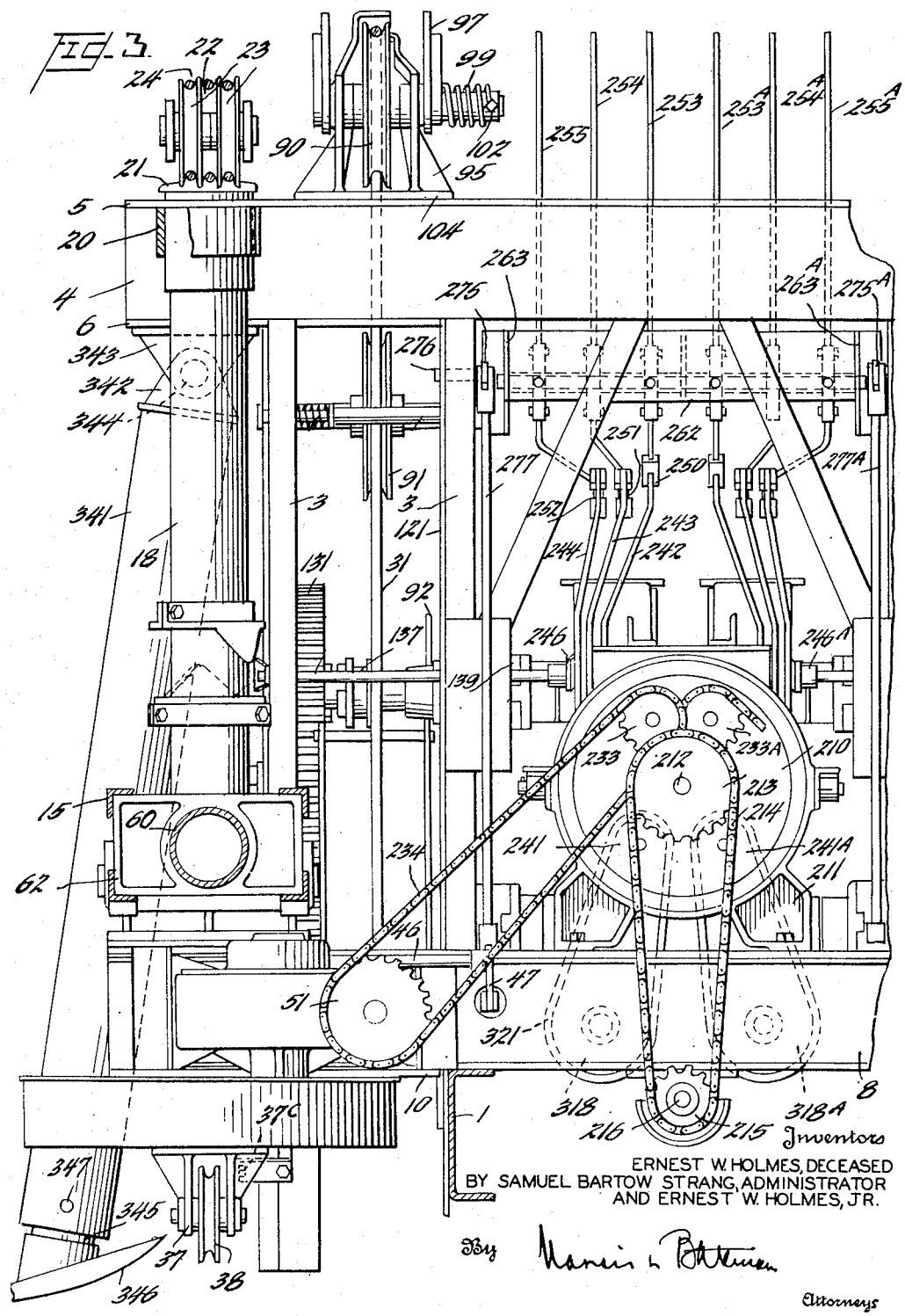

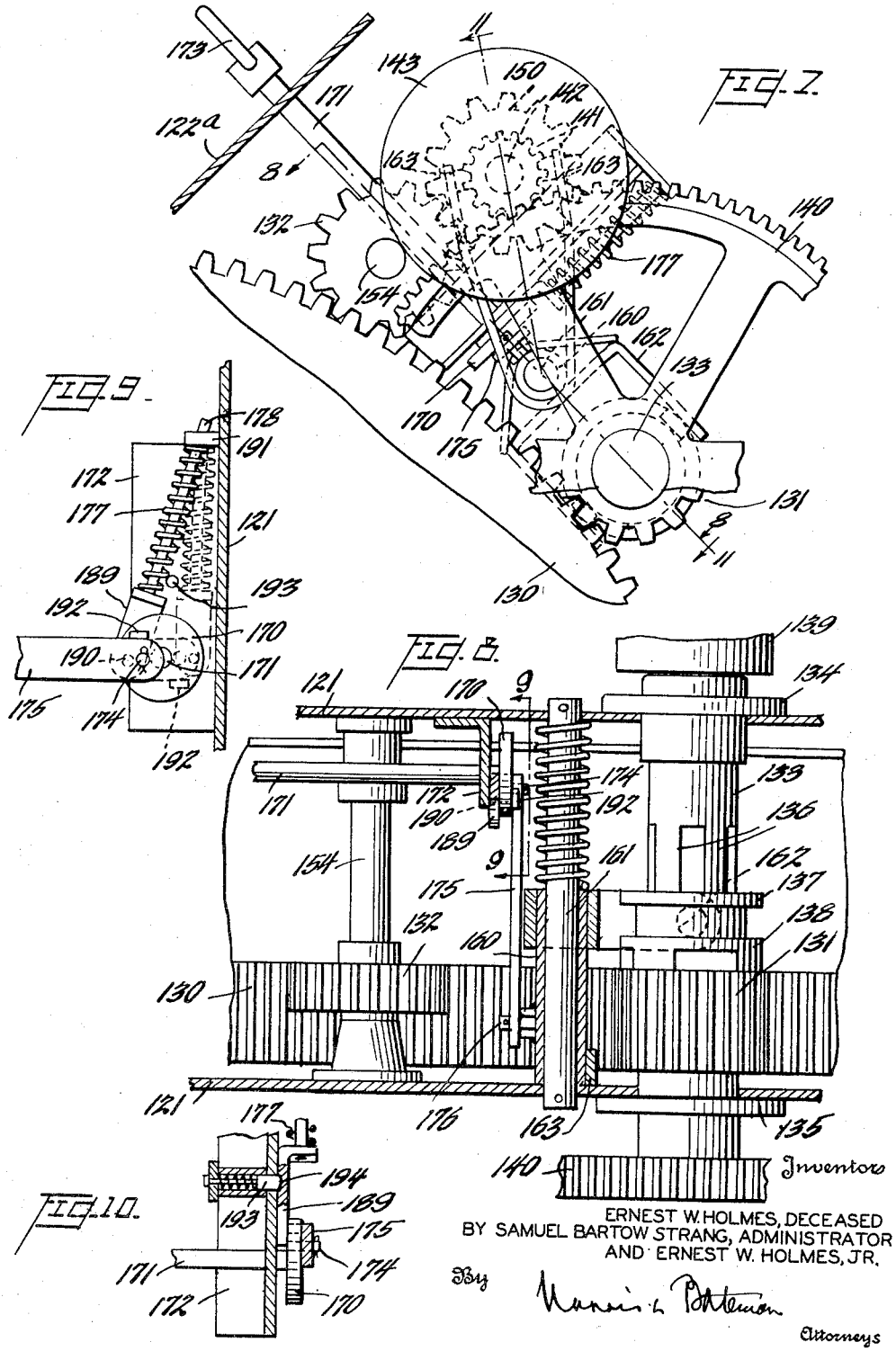

Dec. 28, 1954     E. W. HOLMES ET AL     2,697,948
CABLE DRUM WINDING AND UNWINDING MECHANISM
Filed Dec. 28, 1944     8 Sheets-Sheet 6
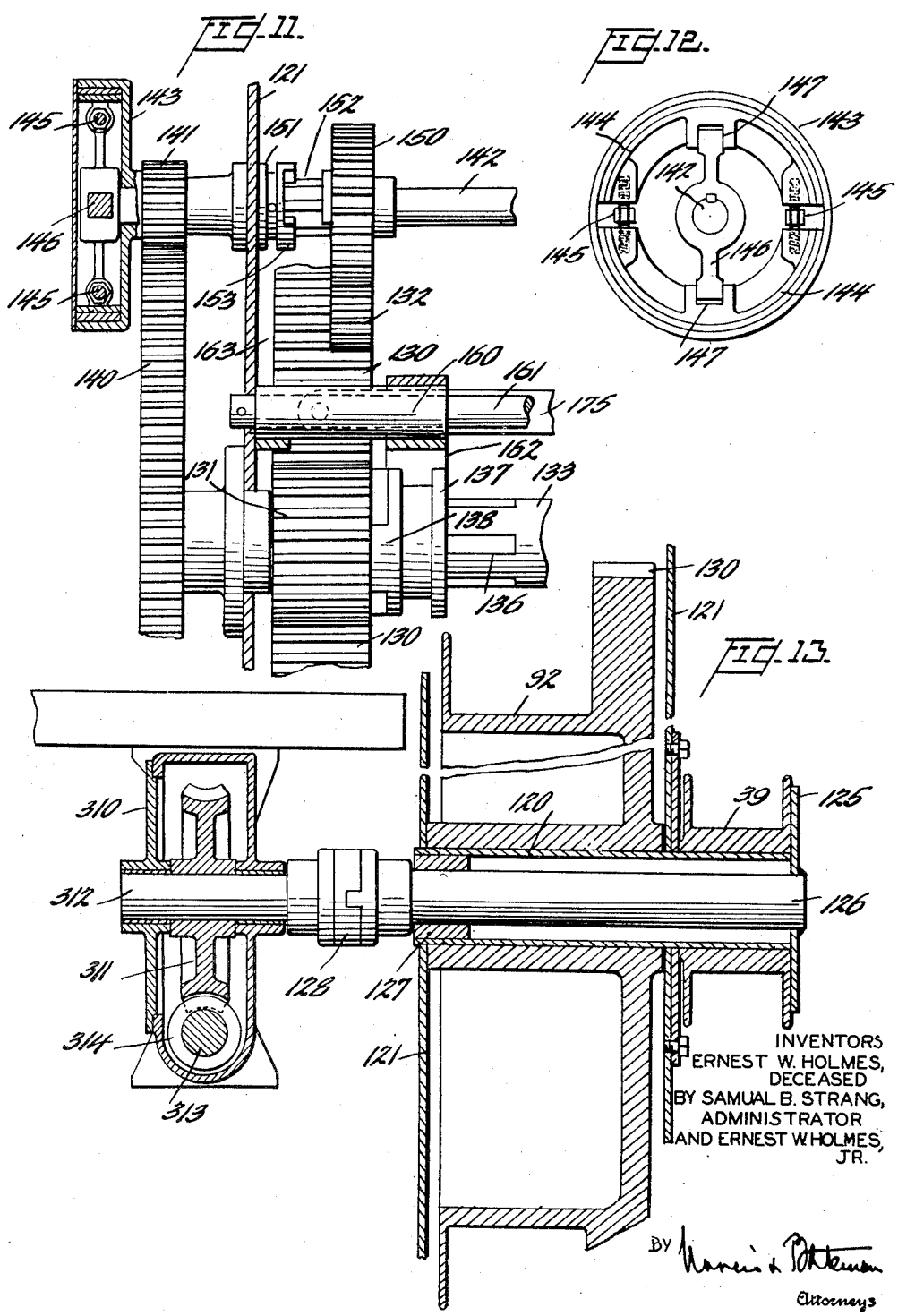
INVENTORS
ERNEST W. HOLMES,
DECEASED
BY SAMUAL B. STRANG,
ADMINISTRATOR
AND ERNEST W. HOLMES,
JR.
BY
Attorneys Dec. 28, 1954     E. W. HOLMES ET AL     2,697,948
CABLE DRUM WINDING AND UNWINDING MECHANISM
Filed Dec. 28, 1944     8 Sheets-Sheet 7

Inventors
ERNEST W. HOLMES, DECEASED
BY SAMUEL BARTOW STRANG, ADMINISTRATOR
AND ERNEST W. HOLMES, JR.

Attorneys

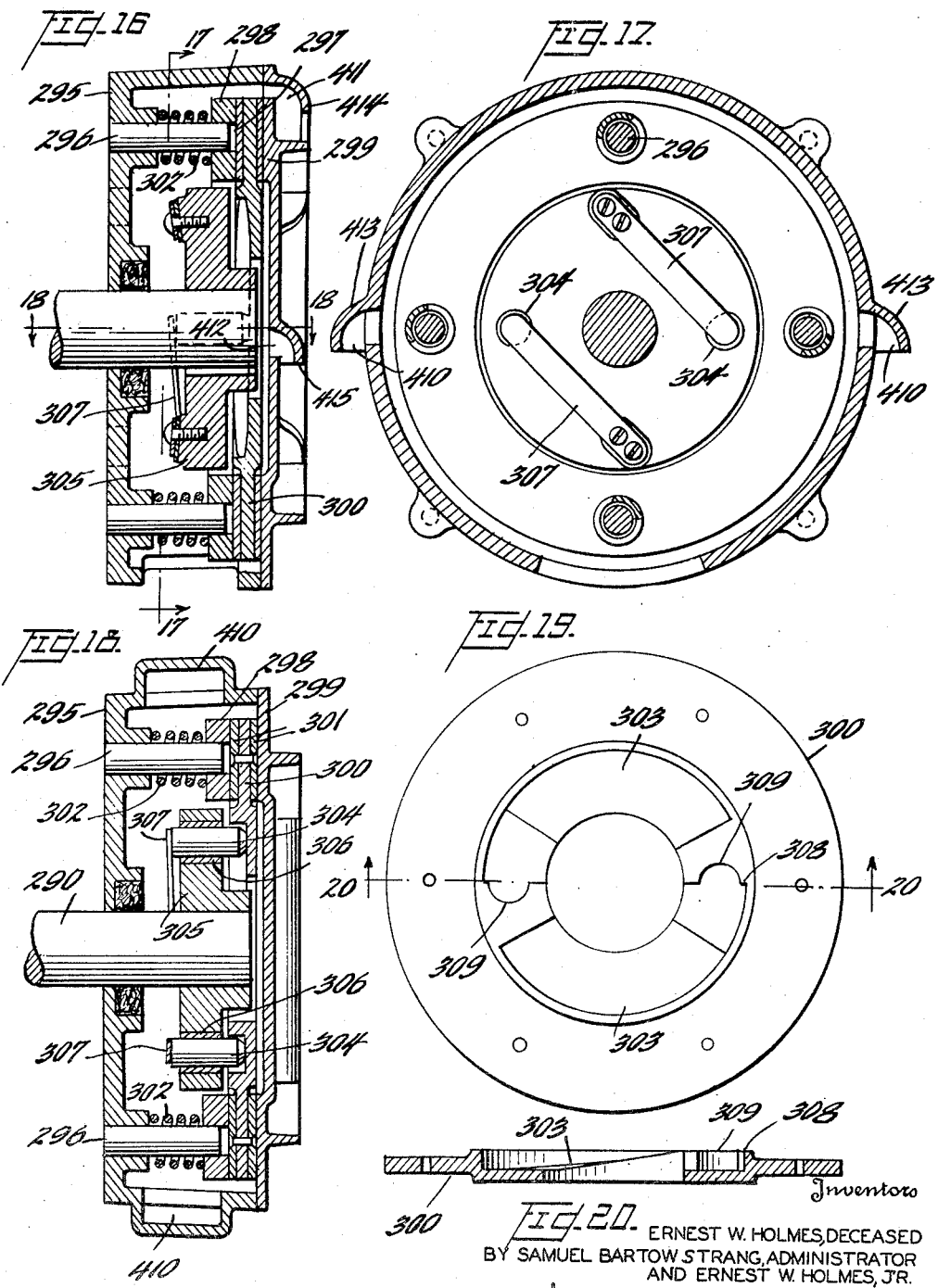

United States Patent Office 2,697,948
Patented Dec. 28, 1954

2,697,948

CABLE DRUM WINDING AND UNWINDING MECHANISM

Ernest W. Holmes, deceased, late of Chattanooga, Tenn., by Samuel Bartow Strang, administrator, Chattanooga, and Ernest W. Holmes, Jr., Chattanooga, Tenn., assignors to Ernest Holmes Company, a corporation of Tennessee Original application December 28, 1944, Serial No. 570,184, now Patent No. 2,479,009, dated August 16, 1949. Divided and this application June 14, 1949, Serial No. 99,094

11 Claims. (Cl. 74—333)

The present invention relates to improvements in wreckers and similar hoisting apparatus, and more especially to apparatus of the mobile type adapted to be mounted on a truck or other suitable vehicle, and comprising means for handling disabled motor vehicles, and for performing hoisting, pulling, towing and other similar operation, this application being a division of prior application Ser. No. 570,184, filed December 28, 1944, now Patent No. 2,479,009, granted August 16, 1949.

One of the primary objects of the present invention is to provide novel and improved means for driving the drum on which the service cable is wound and unwound whereby the service cable may be wound rapidly while slack or the load thereon is relatively light, after which increased power may be applied to the winding of such cable for the lifting or pulling of increased or heavier loads.

Another object is to provide novel means for preventing unwinding of the service and boom cables when the winding means therefor are disconnected from the power means but which will not impose any appreciable resistance to the winding of the respective cable.

To these and other ends, the invention consists in certain improvements and combinations and arrangements of parts, all as will be hereinafter more fully described, the features of novelty being pointed out more particularly in the claims at the end of this specification.

In the accompanying drawings:

Figure 1 is a side elevation of a wrecker to which the present invention is shown applied.

Figure 2 is a top plan, partly in section, of the driving means for the boom cable and service cable drums at one side of the wrecker.

Figure 3 is a rear elevation of the structure shown in Fig. 2.

Figure 4 is a top plan, partly in section, of the boom swinging mechanism at one side of the wrecker, showing also a portion of the driving means for the boom cable winding drum.

Figure 5 is a vertical section taken on the line 5—5 in Fig. 4.

Figure 6 is a detail section of the clutch for connecting the boom to the respective boom swinging mechanism.

Figure 7 is a detail side elevation of the main and overdrive for one of the service cable winding drums.

Figure 8 is a section taken on the line 8—8 in Fig. 7.

Figure 9 is a detail section taken on the line 9—9 in Fig. 8.

Figure 10 is a detail view, in section, of the detent for holding the main and overdrive for the cable winding drum in neutral position.

Figure 11 is a section taken on the line 11—11 in Fig. 7.

Figure 12 is detail view of the friction drive for the service cable winding drum.

Figure 13 is a detail section through the winding drums for the service and boom supporting cables, showing the mountings for these drums and the worm drive for the boom supporting cable.

Figure 16 is a detail section, on an enlarged scale, taken on the line 16—16 in Fig. 15, showing the automatic brake for one of the service drums.

Figure 17 is a vertical section taken on the line 17—17 in Fig. 16.

Figure 18 is a section taken on the line 18—18 in Fig. 16.

Figure 19 is a face view of the cam plate shown in Figs. 16 and 18.

Figure 20 is a section taken on the line 20—20 in Fig. 19.

Figure 14:
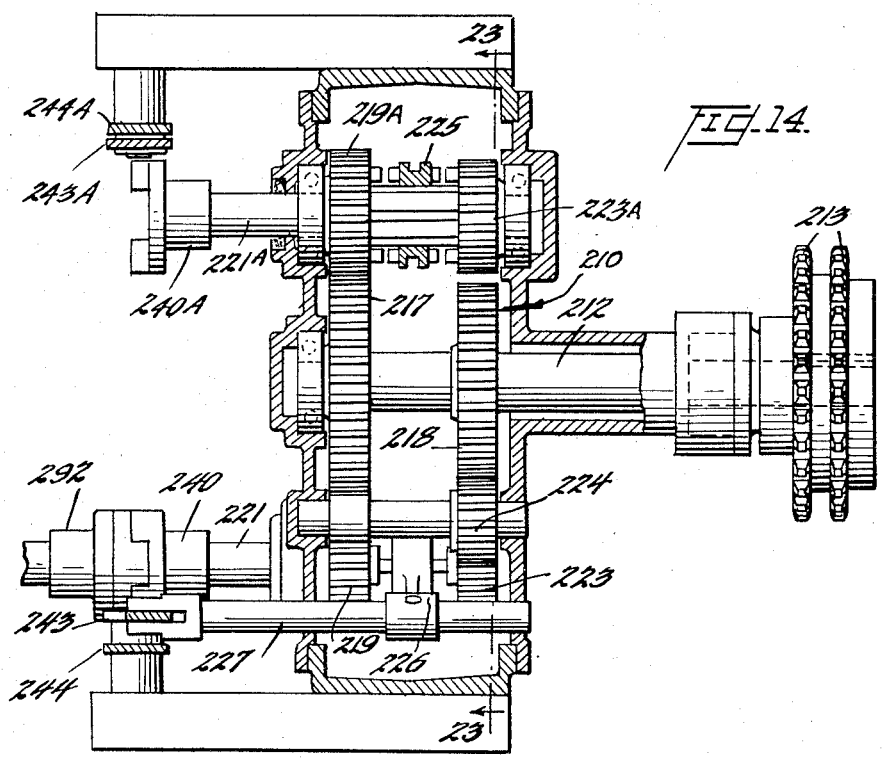
Figure 14 is a horizontal transverse section through the main transmission.

The invention is shown in the accompanying drawings as adapted to be mounted on the chassis of an automotive truck of suitable size and provided with an engine for propelling it, and having a power take-off, which may be of any suitable or well known type, for supplying the power to operate various parts of the wrecker. Since the construction of the truck and its power take-off are well known, it is deemed sufficient to show only the longitudinal frame members 1 of the truck chassis on which the wrecker is mounted and suitably secured.

The wrecker comprises a frame, generally designated 2, composed of pairs of uprights 3 at the respective sides of the frame and composed of channel iron with the flanges of each pair turned inwardly, the upper ends of these uprights being rigidly connected by a cross member 4 composed of a pair of channel irons secured together by top and bottom plates 5 and 6, and the lower ends of the uprights are rigidly secured to a supporting structure comprising a channel iron 7 and an I-beam 8 rigidly secured together by top and bottom plates 9 and 10, thus forming a base for the frame which extends outwardly from the respective adjacent sides of the truck chassis.

The wrecker as shown is of the double boom type in which a boom 15 is pivotally mounted at each side of the frame to swing about a vertical axis, each boom being equipped with power means for swinging it laterally to different desired angles, means for raising and lowering the outer end thereof, and a service cable having means for winding and unwinding it to raise and lower the load and to perform pulling and other operations, as will be hereinafter described. Since both booms and their associated parts are of the same construction, with the exception that they are mounted respectively on the right-hand and left-hand sides of the wrecker, detail illustration and description of one of these booms and its associated parts will suffice for both, the parts on the left-hand side being shown, and corresponding parts on the right-hand side, where they appear, being designated by the same reference numerals but with the distinguishing suffix "A."

As shown in the present instance, each boom comprises a tubular section 60 the lower end of which has a bracket 62 fixed thereto, and the boom is supported at its inner end on a cap 16 to which it is pivotally connected for raising and lowering movements by a horizontal pivot pin 17, the cap 16 being bolted or otherwise fixed to the lower portion of a tubular mast 18 the lower end of which is supported by the cap 16 which is rotatable on a vertical axis in a bearing 19 supported by the plate 9. The upper end of the mast is rotatable in a bearing 20 which is supported by an extension of the plate 5 at the top of the frame. A sheave bracket 21 is fixed to the upper end of the mast to rotate therewith, this bracket carrying sheaves 22 and 23 for the boom supporting cable 24, portions of this cable passing back and forth between the sheaves 23 and sheaves 25 rotatable in a yoke 26, and this yoke being connected to the outer end of the boom in any suitable manner, as by an equalizing sling 27 and sheaves 28 carried by the yoke 26, as shown and described fully in Patent No. 2,405,578, granted August 13, 1946. One end of the boom supporting cable 24 is attached by links 29 to the yoke 26 and the other end of this cable passes around the sheave 22 and then down through the tubular mast to a drum for raising and lowering the boom, as will be hereinafter described. The outer end of the boom carries a sheave 30 around which the service or hoisting cable 31 passes, this cable passing through a guide 32 and usually extending downwardly from the outer end of the boom for hoisting and other operations.

The boom is rotated into different positions about a vertical axis by a gear wheel 35 keyed or otherwise fixed to the lower end of the mast and enclosed in a casing 36. A bracket 37 having a guide sheave 38 mounted therein is provided at the lower end of the mast, an angle iron bracket 37c being attached to the bracket 37 and to the frame of the wrecker to hold the bracket 37 from rotation when the mast is swung about its vertical axis. The boom cable 24 below the lower end of the mast passes around the sheave 38 and extends to the drum 39 onto and from which it is wound and unwound by means hereinafter described. The mast-swinging gear wheel 35 is driven by a pinion 40 (Figs. 4 and 5) which is fixed on a shaft 41 journaled in a gear housing 42 and having a worm wheel 43 mounted for rotation thereon but is adapted to be coupled to the shaft 41 by a clutch collar 44 which is splined on said shaft and has jaws thereon to engage complemental jaws on the upper side of the worm wheel, the clutch collar being moved into engaged and disengaged relation with the worm wheel by a fork 45 which is fixed to a shaft 46 rotatable in the top of the housing 42, an end of this shaft extending to the exterior of the housing and having an operating arm 47 fixed thereon which is connected by the linkage shown to a rod 277, the latter being connected to a controlling lever 275 pivoted on a pin 276 fixed to the frame.

The worm wheel 43 is power driven by a worm 48 which meshes therewith and is fixed to a shaft 49 which is rotatably mounted in the housing 42 by ball bearings 50, an end of the worm shaft having a sprocket wheel 51 fixed thereon for driving it through a chain 234 and sprocket wheel 233 from appropriate gearing in a transmission 210, the construction of which is fully shown and described in the prior application hereinbefore referred to. A friction brake comprising a conical collar 52 splined to the worm shaft by a key 53 and pressed by a compressed coil spring 54 against an end of the housing serves to prevent backing off of the worm wheel while the power drive is not in operation.

Each service cable 31 extends down around a sheave 90 past an idler sheave 91 to a service drum 92, the sheave 90 being mounted on the cross member 4 and rotatable on a shaft 93 fixed in the flanges 94 of a bracket 95 having a base plate 104, and a cable guide 97 straddles the flange 94 and is rotatable on the shaft 93 for yieldingly supporting the service cable under the action of a coil spring 99 one end of which is connected to the guide 97 and the other end of which is connected to a sleeve which is fixed to the shaft 93 by a screw 102. A similar shaft 93A and the parts associated therewith as described is provided for the service cable at the other side of the wrecker. Each service cable is adapted to be wound upon and unwound from the drum 92 to perform the hoisting, pulling and other operations, this drum being mounted rotatably on a sleeve or hollow shaft 120 (Fig. 13) which spans the space between and is secured in a pair of plates 121 between which the drum is accommodated, these plates having vertical edges which are bolted, welded or otherwise securely fixed to the respective pair of uprights 3, as shown in Fig. 2, the lower edges of these plates being bolted or otherwise firmly fixed to the truck chassis and providing means for rigidly supporting the wrecker frame on the truck chassis. Casing sections 122 and 123 attached to the plates 121 enclose the upper and lower sides of the service cable drum.

The sleeve 120 also supports the boom cable drum 39 which is rotatably mounted thereon at the respective side of the wrecker, this drum being driven by a plate 125 which is fixed thereto and to the outer end of the shaft 126 which is journaled in a bearing 127 supported within the sleeve 120. The shaft 126 for the boom cable drum at the respective side of the wrecker is driven, through a coupling 128, from a worm wheel 311 the shaft 312 of which is journaled in a gear casing 310, the worm wheel being driven by a worm 314 on a shaft 313 which is connected by universal joints 315 and 316 and shaft 317 to a sprocket wheel 318, the latter being mounted on a shaft 319 journaled in a bearing 320 secured by bolts 359 to the lower frame member 7, and the sprocket wheel 318 being driven by a chain 321 from a sprocket wheel 241 connected to appropriate driving gearing in the main transmission 210. The boom cable drum at the other side of the wrecker is connected by a coupling 128A to similar driving means for that drum comprising a gear casing 310A containing worm wheel and worm gearing as in the casing 310, the worm shaft from the casing 310A being connected by universal joint 315A and shaft 317A to a sprocket wheel 318A the shaft of which is journaled in a bearing 320A, and this sprocket wheel, as shown, is connected by a chain to a sprocket wheel 241A on the appropriate shaft of the gearing in the main transmission 210.

Each service cable drum 92 is driven through a gear 130 which is formed integrally with or attached to one of its flanges. The present invention provides novel means whereby each service drum may be rotated rapidly, as for example, to wind the respective service cable quickly while slack or under a relatively light load, and to be driven more slowly and with greater power while under a relatively heavy load. Such two-speed drive for each service drum, as shown clearly in Figs. 1, 2, and 7 to 11 inclusive, comprises a main driving pinion 131 and a high speed pinion 132 which mesh constantly with the gear 130. This main pinion 131 is mounted rotatably on a shaft 133 journaled in bearings 134 and 135 fixed in the respective sides of the plates 121, this shaft being provided with splines 136 on which a clutch collar 137 is slidable, this clutch collar being thereby driven from said shaft and having clutch jaws 138 thereon which are engageable with or disengageable from complemental jaws on the adjacent side of the pinion 131 whereby the latter may be coupled to and uncoupled from the shaft 133. The shaft 133 is provided at one end with a coupling 139 for connecting it to its power operating means, to be hereinafter described. A relatively large gear wheel 140 is fixed to the other end of the shaft 133, and this gear wheel meshes with a relatively small pinion 141 mounted on a shaft 142, whereby the latter may be driven from the shaft 133. A friction drive is preferably employed between the shafts 133 and 142 whereby the drive of the shaft 142 will be relieved or interrupted automatically when the load on the service cable exceeds a given amount. For this purpose, the pinion 141 is formed on or fixed to the hub of a friction drum 143 which is mounted rotatably on the shaft 142 and houses a pair of friction shoes 144 arranged to frictionally engage its interior surface under a pressure which is regulated by screws 145 which connect the shoes and are adjustable to relatively expand or contract the shoes. These shoes drive the shaft 142 through a cross arm 146 which is fixed to said shaft, and the ends of which engage in sockets 147 in the friction shoes.

The shaft 142 has a gear 150 mounted rotatably thereon and adapted to be coupled thereto by a clutch collar 151 which is slidable on splines 152 on said shaft which splines drive said collar. The clutch collar 151 has clutch jaws 153 which are engageable with and disengageable from complemental clutch jaws provided on the adjacent face of the gear 150. The gear 132 is mounted on a shaft 154, and this shaft and the shaft 142 are journaled in bearings mounted in the plates 121. Since the shaft 142 will be driven by the gear 140 and pinion 141 in a direction reverse to the direction of rotation of the shaft 133, the pinion 132 is interposed as an idler gear between the gear 150 and the drum gear 130, so that the main pinion 131 and also the higher speed or overdrive pinion 132 will both drive the drum in the same direction for a given direction of rotation of the drive shaft 133.

Each main pinion 131 and overdrive gear 150 are selectively rendered operative to drive the respective service drum under manual control of the operator. The control means provided for this purpose comprises, in the present instance, a clutch shifter slide 160 which is guided to move parallel to the shafts 133 and 142 by a rail 161 on which it is slidable, this rail being supported by the plates 121. The slide 160 is provided at one end with a shifter fork 162 which engages and controls the clutch collar 137, and is provided at its other end with a shifter fork 163 which engages and controls the clutch collar 151. These shifter forks are so arranged that when the fork 162 shifts the collar 137 into engagement with the main pinion 131, the fork 163 disengages the collar 151 from the gear 150, the drum 92 being then driven by the main pinion, and when the fork 163 shifts the collar 151 into engagement with the gear 150, the fork 162 disengages the collar 137 from the pinion 131, the drum 92 being then driven through the overdrive gear 150. When the forks are brought into their mid-positions, both clutch collars will be in disengaged positions, the drive for the service cable drum being then in neutral.

The manual means shown in the present instance for reciprocating each clutch shifter slide 160 comprises a crank disk 170 which is fixed on a shaft 171, the inner end of the latter being mounted rotatably in an angle iron 172 fixed to the inner side of one of the plates 121, and the outer end of this shaft extending through a casing section 122a and being provided with an exterior handle 173 by means of which it may be rotated. The crank disk 170 carries a crank pin 174 which engages one end of a link 175, the other end of this link engaging a pin 176 fixed to the clutch shifter slide 160. (Figs. 8, 9 and 10.) The throw of the crank pin 174 is preferably such that when the disk 170 is rotated to bring this crank pin into alignment between the pin 176 and the shaft 171, the slide 160 will be fully shifted to a position to fully engage the clutch collar 137 with the main drive pinion 131, and when the disk 170 is rotated through a half revolution, or substantially so, the clutch collar 151 will be fully engaged with the gear 150. A compressed coil spring 177 is preferably employed for biassing the disk toward and yieldingly holding it in one or the other of such clutch engaging positions, this spring encircling a rod 178 carried by a link 189 which is pivotally connected to the disk 170 by a pin 190 adjacent to the crank pin 174, the rod 178 being slidably guided by a lug 191 fixed to the inner side of the adjacent plate 121. Overthrow of the disk 170 under the influence of the spring 177 in a direction to disengage the clutch collar 137 and engage the clutch collar 151 is prevented by a lug 192 on the disk 170 which projects laterally therefrom in a position to come to rest on the link 175 when the shifter slide has been fully shifted in said direction. Overthrow of the crank disk in the opposite direction under the influence of the spring 177 will be prevented by abutting of the lug 192 against the other side of link plate 175. A spring-pressed plunger 193 is preferably mounted in the angle iron 172 in a position to engage yieldingly in a recess 194 in the link 189 when the crank disk 170 is in its mid-position, the clutch shifter slide being thereby held in its middle or neutral position with both clutch collars disengaged, the plunger yieldingly to permit rotation of the crank disk when sufficient force is applied to rotate the shaft 171, and thereby effect a clutch shifting operation.

The driving means thus provided for each service cable drum enables the respective service cable to be wound or unwound rapidly through the high speed or overdrive, whenever desired, as when taking up slack or lifting or pulling relatively light loads by the service cable, and to be wound with greater power, as while lifting or pulling relatively heavy loads. When the drive for this drum is placed in neutral, both drives will be unclutched therefrom, and any desired length of the service cable can then be pulled manually from its drum.

The main power transmission 210 for operating the service cables and boom supporting cables, and the boom swinging means at both sides of the wrecker, is fully shown and described in Patent No. 2,479,009 hereinbefore referred to, it being deemed sufficient for the purposes of the present invention to describe it as having its casing bolted or otherwise fixed by its feet 211 to the base frame composed of the transverse members 7 and 8, and having a main drive shaft 212 mounted centrally therein and provided on its outer end with a sprocket wheel 213 adapted to receive a chain 214 for driving it from a sprocket wheel 215 on a countershaft 216 mounted in suitable bearings on the underside of the frame base, the countershaft being adapted to be connected by the usual or known means to the conventional power take-off of the transmission of the truck.

The main shaft 212 of the transmission (Fig. 14) carries a pair of gears 217 and 218 which are fixed thereto, and which cooperate with sets of gears to drive them in relatively reverse directions. The gear 217 is of larger diameter than the gear 218, and it meshes directly with a set of pinions 219 and 219A which are mounted rotatably on a set of shafts, two of which are shown and designated 221 and 221A respectively. Each of these shafts also has a pinion 223 or 223A mounted rotatably thereon, these latter pinions being of smaller diameter than the pinions 219 and 219A, and being geared to the relatively smaller gear 218 by intermediate or idler pinions one of which is shown and designated 224. By this arrangement, the pinions 219 and 219A, being meshed with gear 217, will be driven in the opposite direction to that of gear 217, and the pinions 223 and 223A, having the idler pinions interposed between them and the smaller gear 218, will be driven in the same direction as gears 217 and 218, both of which are mounted on and rotate with the main central shaft. The shafts 221 and 221A carrying the pinions 219 and 219A and 223 and 223A respectively are splined and carry individual clutch collars 225 which are rotatable with these shafts and are slidable axially on the splines thereon to couple one or the other pinion 219 or 219A or 223 or 223A to the respective pinion shaft, each clutch collar being provided for this purpose with clutch jaws on its opposite ends to engage respectively complemental clutch jaws on one or the other pinion, according to the direction in which the clutch collar is shifted. The clutch collar on each pinion shaft is provided with a shifting fork 226 which is carried by a shifting rail 227 which is slidable in the casing of the transmission 210.

The shafts 221 and 221A are provided with couplings 240 and 240A respectively for driving the service cable drums at the left-hand and right-hand sides, respectively, and the rail controlling the drive of the shaft 221 in forward or reverse direction is controlled by a hand lever 254 connected by a link 251 to a lever 243, and the rail controlling the drive by the shaft 221A is controlled by a hand lever 254A and lever 243A and link similar to the lever 243 and link 251.

The main transmission 210, as shown and described in Patent No. 2,479,009 hereinbefore referred to, is provided also with shafts, pinions and clutches for controlling the boom supporting cable drum and the means for swinging the booms. The boom swinging means at one side of the wrecker is controlled by a lever 242, link 250 and a hand lever 253 and the boom swinging means at the other side of the wrecker is controlled by a similar lever 242A, link and hand lever 253A, and the boom supporting cable at one side of the wrecker is controlled by a lever 244, link 252 and hand lever 256 and at the other side of the wrecker by a similar lever 244A, link and hand lever 255A. The hand levers 253, 254 and 255, and 253A, 254A and 255A are mounted on a common shaft 262 supported on the top cross member 4 of the frame brackets 263 and 263A. The levers 242 and 242A are mounted on an upper shaft having yokes 246 and 246A to enable the levers 243 and 243A and the levers 244 and 244a to clear and extend downwardly below said upper shaft. The control levers 275 and 275A are pivotally connected to the upper ends of the rods 277 and 277A which control the boom swinging means at the respective sides of the wrecker, these levers being mounted on pivot pins on the frame, one of which is shown at 276.

A leg is provided at each side of the wrecker for stabilizing it when heavy loads are being lifted or pulled at a side, each leg comprising a tubular upper section 341 having lugs 342 pivotally connected to lugs 343 on the frame by a pin 344, and a lower section 345 which telescopes within the section 341 and is provided with a foot 346 at its lower end for engagement with the ground. The length of the leg is adjusted according to the angle at which it is swung outwardly, and is locked at such adjustment by a pin 347 which is inserted through holes in the upper section and appropriate holes in the lower section.

Figure 15:
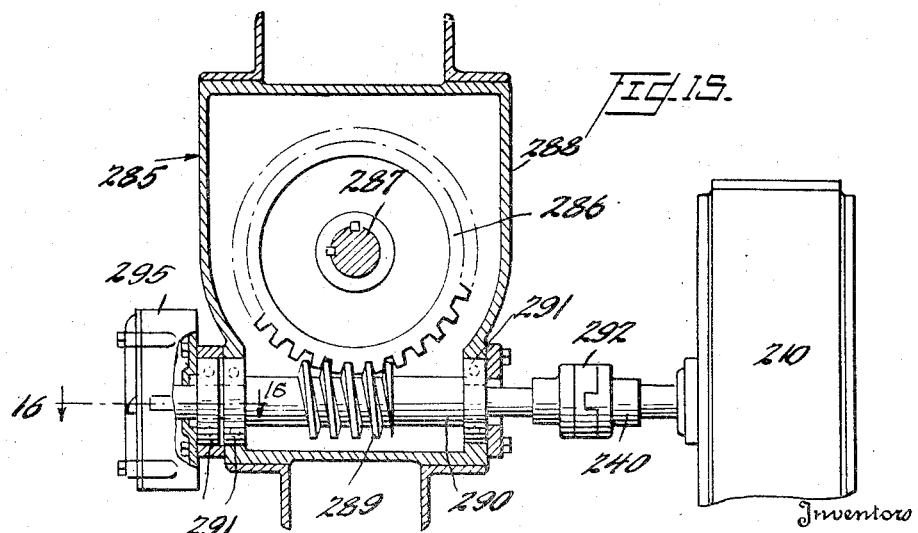
Figure 15 is a side elevation, partly in section, showing the worm gearing for driving one of the service cable drums.

The power drives for the service cable drums at the respective sides of the wrecker comprise a pair of worm gearings 285 and 285A (Fig. 2) one of these gearings being shown in detail in Fig. 15. Each of these gearings comprises a worm wheel 286 which is fixed on a shaft 287 suitably journaled in a housing 288 mounted in fixed position on the stationary frame of the wrecker, the worm wheel shaft 287 being connected to the coupling 139 on the main pinion shaft 133 which drives the service cable drum 92. The worm wheel is driven by a worm 289 fixed on a shaft 290 mounted on ball bearings 291 in the housing 288, and the worm shaft at one side of the wrecker is connected by a coupling 292 to the coupling 240 on the respective pinion shaft in the main transmission, and the worm shaft for driving the service cable drum at the other side of the wrecker being coupled to the coupling member 240A on the respective pinion shaft 221A in the main transmission.

In order to overcome any tendency of the worm 289 to back off while a load is supported by the respective service cable and the power drive therefor is not in operation, the worm gearing for each of the service cable winding drums is preferably provided with a brake which will prevent such backing off but will not impose any appreciable resistance upon such gearing while a load is being lifted or pulled by the service cable. The brake for the worm gearing for the service cable winding drum at each side of the wrecker comprises, as shown in Figs. 15 to 20 inclusive, a casing 295 which is bolted to the housing 288 and into which one end of the worm shaft 290 extends, this casing having a suitable number of pins 296 secured therein in parallelism with said shaft and spaced around it, these pins engaging in correspondingly spaced holes 297 in an annular pressure plate 298 so that this plate is held against rotation but is movable axially of the casing. The casing is provided with a cover 299 which is bolted or otherwise rigidly secured thereto opposite to the plate 298, and a friction disk 300 is interposed between said plate and the cover, this disk being preferably faced on its opposite sides with rings 301 of suitable friction material. Pre-loaded springs 302 encircle the pins 296 between the casing 295 and the plate 298, and press the latter against the friction disk 300 and the latter against the cover 299 to impose a predetermined resistance to rotation of the friction disk. The friction disk 300 is formed with a pair of diametrically opposite helical cams 303 on which ride the ends of a pair of diametrically opposite pins 304 carried by a collar 305 keyed or otherwise connected to the worm shaft 290 to rotate therewith, these pins extending through and being movable axially in holes 306 in said collar and being attached to leaf springs 307 which are secured to the face of the collar 305 remote from the cams, and acting to maintain the pins 304 in contact therewith. Shoulders 308 are formed between the raised end of each cam and the adjacent depressed end of the other cam, and recesses 309 are formed in these shoulders in positions to receive the pins 304. Normally, rotation of the worm shaft 290 in a direction to unwind the cable on the service drum will be resisted when the pins 304 are carried by retrograde rotation of the worm shaft into engagement with the recesses 309 in the friction disk 300, rotation of the latter being resisted frictionally under the action of the pre-loaded springs 302. Unwinding of the service cable while a load is thereon and the power drive is disconnected from the service cable drum is thereby prevented, although the friction brake action provided is not sufficient to prevent or resist to an objectionable extent, unwinding of the cable by power driving of the drum to lower or release the load. By turning the handle 173 into its neutral position while there is no load on the service cable, both power drives for the respective drum will be unclutched therefrom, as hereinbefore described, and any desired length of the respective service cable can be pulled manually from the drum without resistance from the brake. However, when the worm is driven in a direction to effect winding of the service cable on its drum, as in lifting or pulling a load, the pins 304 are carried in a reverse direction around the cams 303 and they ride idly over the shoulders 308 thereon, with the result that the pins 304 do not rotate the friction disk 300 but permit the worm shaft to rotate in a cable winding direction freely and without any brake action thereon. Ventilating openings 410, 411 and 412 are provided in the sides and end of the brake casing for the circulation of air for cooling, these openings being protected against the entrance of rain or moisture by louvres 413, 414 and 415.

Brakes as described for the service cable winding drums are also preferably provided for the boom cable winding drums 39, the worm gearings 310 and 310A for these drums being provided with such brakes 295 and 295A as shown in Fig. 4, these brakes being applied to the worm shafts 313 of these worm gearings in the same manner as hereinbefore described with respect to the worm shafts 290 for the service cable winding drums.

The brakes thus provided for the service cable winding drum and for the drum for the cables which support and raise and lower the boom automatically hold the boom cable winding drum from backing off under the weight of the boom and any load that may be suspended therefrom when the power means is disconnected from this drum, and after the service cable winding drum has lifted a load and the power drive is disconnected therefrom, the brake for this drum acts automatically to prevent unwinding of the service cable therefrom, thus supporting the load on the service cable.

The two-speed drive for the service cable drum also facilitates and saves time in the operation of the wrecker. If a large amount of slack is to be taken up in either service cable, or a relatively light load is to be pulled over a considerable distance, such may be accomplished rapidly by setting the high speed or overdrive for the respective service cable winding drum into operation by turning the handle 173 in the appropriate direction, the overdrive gearing causing this drum to wind the service cable more rapidly than when the main drive is in operation. If the load becomes too heavy for the overdrive, the friction drive therefrom will slip, thus avoiding damage to the overdrive, and the overdrive may be unclutched and the main drive pinion may then be brought into operation by turning the handle 173 in the opposite direction.

Other structures shown in the drawings are described in Patent No. 2,479,009 hereinbefore referred to, and to which reference may be had for a detailed explanation thereof.

We claim:

1. Hoisting apparatus comprising a cable winding drum, gearing for rotating the drum at relatively low speed, gearing for rotating the drum at a relatively higher speed, power means and a reversible transmission common to said low and high speed gearings for driving each of said gearings to rotate the drum in either cable winding or unwinding direction, a pair of clutches and a reciprocable slide cooperative therewith operable to disconnect either of said gearings from the power means and to connect the other gearing thereto, means including a rotatable crank connected to said slide for reciprocating it and for yieldingly holding one or the other of the clutches in connecting relation with the respective gearing, and means cooperative with said crank for yieldingly holding both of said clutches in disconnected relation with said gearings.

2. Hoisting apparatus comprising a cable winding drum, gearing for rotating the drum at relatively low speed, gearing for rotating the drum at a relatively higher speed, power means and a reversible transmission common to said low and high speed gearings for driving each of said gearings to rotate the drum in either cable winding or unwinding direction, a pair of clutches and a reciprocable slide connected thereto operable to disconnect either of said gearings from the power means and to connect the other gearing thereto, a rotatable crank connected to said slide for reciprocating it and for yieldingly holding one or the other of the clutches in connecting relation with the respective gearing, and means cooperative yieldingly with said crank for holding both of said clutches in disconnected relation with the respective gearings.

3. Hoisting apparatus comprising a cable winding drum, an operating gear connected thereto, a main driving shaft having means for rotating it to drive the drum in either cable winding or unwinding direction and said main driving shaft having a pinion thereon engaging said gear, a second pinion mounted with its axis parallel with the axis of the main driving shaft and engaging said gear, gearing connecting the main driving shaft to said second pinion for driving the latter at a higher speed than that of the first-mentioned pinion, a clutch for connecting the first-mentioned pinion to the main driving shaft, a clutch for connecting said second pinion to said gearing for driving the latter in either cable winding or unwinding direction, a clutch shifter movable parallel to the axes of said main driving shaft and second pinion for disengaging one of said clutches and engaging the other clutch at a single operation, and means acting yieldingly on said clutch shifter for holding both of said clutches in disengaged condition.

4. Hoisting apparatus comprising a cable winding drum, a gear connected thereto for operating it, a main drive shaft having means for rotating it to drive the drum in either cable winding or unwinding direction and said main driving shaft having a pinion mounted rotatably thereon and engaging said gear, a second shaft having a second pinion mounted rotatably thereon, an idler pinion engaging said gear and second pinion, means including a pre-loaded slip-drive for connecting said shafts to drive said second shaft in either cable winding or unwinding direction at a higher speed than that of the main drive shaft, and clutches for connecting the shafts to the respective pinions thereon.

5. Hoisting apparatus comprising a cable winding drum, a gear connected thereto for operating it, a main drive shaft having means for rotating it to drive the drum in either cable winding or unwinding direction and said main driving shaft having a pinion mounted rotatably thereon and engaging said gear, a second shaft parallel to the main drive shaft and having a pinion mounted rotatably thereon, an idler pinion engaging said gear and second pinion, means for connecting said shafts to drive said second shaft in either cable winding or unwinding direction at a higher speed than that of the main drive shaft, clutches for connecting the shafts to the respective pinions thereon, and a clutch shifter connected to said clutches and operative, by movement in one direction parallel to said shafts, to disconnect one of the shafts from its respective pinion thereon and to connect the other shaft to its respective pinion thereon.

6. Hoisting apparatus comprising a cable winding drum, a gear connected thereto for operating it, a main drive shaft having a pinion mounted rotatably thereon and engaging said gear, a second shaft having a second pinion mounted rotatably thereon, an idler pinion engaging said gear and second pinion, means for connecting said shafts to drive said second shaft at a higher speed than that of the main drive shaft, clutches for connecting the shafts to the respective pinions thereon, and a clutch shifter movable parallel to the axes of said shafts and connected to said clutches and operative, by movement in either direction, to disconnect one of the shafts from its respective pinion thereon and to connect the other shaft to its respective pinion thereon.

7. Hoisting apparatus comprising a cable winding drum, a gear connected thereto for operating it, a main drive shaft having a pinion mounted rotatably thereon and engaging said gear, a second shaft having a second pinion mounted rotatably thereon, an idler pinion engaging said gear and second pinion, means for connecting said shafts to drive the second shaft at a higher speed than that of the main drive shaft, clutches for connecting the shafts to the respective pinions thereon, a clutch shifter movable parallel to the axes of said shafts and connected to said clutches and operative, by movement in either direction, to disconnect one of the shafts from its respective pinion thereon and to connect the other shaft to its respective pinion thereon, and means for yieldingly holding the clutch shifter in either of its operated positions.

8. Hoisting apparatus as defined in claim 7, including means for yieldingly holding the clutch shifter in an intermediate position in its movement to hold both clutches disengaged.

9. Hoisting apparatus comprising a cable winding drum, gearing for rotating the drum at a relatively low speed, gearing for rotating the drum at a relatively higher speed, power means and a reversible transmission common to said low and higher speed gearings for operating either of said gearings to rotate the drum in either cable winding or unwinding direction, and control means including means operative to connect the low speed gearing to said power means and concurrently disconnect the higher speed gearing therefrom or to connect the higher speed gearing to said power means and concurrently disconnect the low speed gearing therefrom, and to disconnect both of said gearings from said power means, means for yieldingly maintaining the operative connection between each of said gearings and the power means, and means for yieldingly maintaining both of said gearings in disconnected relation with the power means.

10. Hoisting apparatus as defined in claim 9, wherein said control means comprises a pair of clutches for connecting said low speed and higher speed gearings respectively to said power means, a member connecting said clutches and reciprocable in one or other direction to simultaneously operate said clutches to disconnect either of said gearings from said power means and connect the other gearing thereto, means for yieldingly holding said member in its operated position when reciprocated in either direction, and means for yieldingly holding said member in a position intermediate said operated positions.

11. Hoisting apparatus as defined in claim 9, wherein said means for connecting said gearings to and disconnecting them from said power means includes a reciprocatory member, and a crank connected to said member and rotatable into either of two positions to disconnect one of said gearings from said power means and to connect the other of said gearings thereto, and wherein said means for yieldingly maintaining the operative connection between said gearings and said power means comprises a spring acting to hold said crank in either of its said two positions, and said means for yieldingly maintaining both of said gearings in disconnected relation with said power means comprises spring actuated means for holding said crank in a position intermediate between its said two positions.

References Cited in the file of this patent

UNITED STATES PATENTS

| Number | Name | Date |
|---|---|---|
| 253,714 | Jarboe | Feb. 14, 1882 |
| 1,143,547 | McGiffert | June 15, 1915 |
| 1,394,098 | Lake et al. | Oct. 18, 1921 |
| 1,714,428 | Langford | May 21, 1929 |
| 1,892,940 | Erdahl | Jan. 3, 1933 |
| 1,913,706 | Erdahl | June 13, 1933 |
| 1,999,202 | Osgood | Apr. 30, 1935 |
| 2,254,989 | Benson | Sept. 2, 1941 |
| 2,264,569 | Holmes | Dec. 2, 1941 |
| 2,294,769 | Black et al. | Sept. 1, 1942 |
| 2,335,318 | Simmons | Nov. 30, 1943 |
| 2,390,891 | Martin | Dec. 11, 1945 |
| 2,465,604 | Potter | Mar. 29, 1949 |
| 2,579,554 | Davis | Dec. 25, 1951 |